(12) United States Patent
Shipman

(10) Patent No.: US 9,916,781 B2
(45) Date of Patent: Mar. 13, 2018

(54) ILLUMINATED VEHICULAR SIGN

(71) Applicant: Michael Shipman, Newport Beach, CA (US)

(72) Inventor: Michael Shipman, Newport Beach, CA (US)

(*) Notice: Subject to any disclaimer, the term of this patent is extended or adjusted under 35 U.S.C. 154(b) by 417 days.

(21) Appl. No.: 14/070,888

(22) Filed: Nov. 4, 2013

(65) Prior Publication Data
US 2014/0053437 A1 Feb. 27, 2014

Related U.S. Application Data

(63) Continuation-in-part of application No. 13/385,697, filed on Mar. 2, 2012, now Pat. No. 8,585,263.

(51) Int. Cl.
| | |
|---|---|
| G09F 21/22 | (2006.01) |
| G09F 13/22 | (2006.01) |
| G09F 13/20 | (2006.01) |
| B60Q 1/26 | (2006.01) |
| B60Q 1/50 | (2006.01) |
| G09F 13/18 | (2006.01) |
| G09F 21/04 | (2006.01) |

(Continued)

(52) U.S. Cl.
CPC ............ *G09F 13/22* (2013.01); *B60Q 1/2611* (2013.01); *B60Q 1/503* (2013.01); *G09F 13/005* (2013.01); *G09F 13/18* (2013.01); *G09F 13/20* (2013.01); *G09F 21/04* (2013.01); *B64D 47/06* (2013.01); *G09F 2013/222* (2013.01); *G09F 2013/225* (2013.01); *G09F 2013/227* (2013.01)

(58) Field of Classification Search
CPC ....... G02B 6/006; G02B 6/0078; G09F 13/20; G09F 13/22; G09F 21/04; G09F 2013/222; G09F 2013/227; G09F 13/005; G09F 13/00; G09F 13/04; G09F 2013/225; G09F 21/043; G09F 21/048; B60Q 1/2611; B60Q 1/503; B60Q 1/2615; B60Q 1/2696; B60Q 2400/00; B62D 25/06; H01Q 1/3275; H04B 1/1607; H05B 33/00

USPC ........ 362/84, 97.1–97.4, 227, 238, 240–247, 362/249.01, 249.02, 479, 484, 493, 496, 362/540, 542–546, 800, 802, 812; 340/6.1, 468, 471, 472, 815.4, 815.45, 340/902; 40/492, 541–544, 550–553, 40/556, 563, 564, 591, 592

See application file for complete search history.

(56) References Cited

U.S. PATENT DOCUMENTS

| | | |
|---|---|---|
| 1,192,982 A | 8/1916 | Bristol et al. |
| 1,373,167 A | 3/1921 | Brooks |

(Continued)

*Primary Examiner* — Hargobind S Sawhney
(74) *Attorney, Agent, or Firm* — David Duckworth

(57) ABSTRACT

An illuminated vehicular sign is provided including a vehicle and luminescent planar sheet. The luminescent planar sheet is constructed to provide illuminated alpha-numeric characters which are mounted to the horizontal planar surfaces of a vehicle. The alpha-numeric characters are mounted substantially horizontally so as to be seen from the air such as by helicopters or planes. The illuminated vehicle sign includes a switching system electrically connected to the luminescent planar panels for selectively controlling the transfer of power from said power source to the luminescent planar panels. The switching system including one or more adjustable variable resistors electrically connected to the luminescent planar panels for allowing one to selectively adjust the wattage provided to them.

3 Claims, 13 Drawing Sheets

(51) Int. Cl.
  *G09F 13/00*  (2006.01)
  *B64D 47/06*  (2006.01)

(56) References Cited

U.S. PATENT DOCUMENTS

| | | | |
|---|---|---|---|
| 2,891,140 A | 6/1959 | Huff | |
| 3,622,838 A * | 11/1971 | Michalski | H05B 41/3924 315/100 |
| 4,028,828 A | 6/1977 | Chao et al. | |
| 4,259,660 A * | 3/1981 | Oliver | 340/480 |
| 4,426,028 A | 1/1984 | Bott | |
| 4,645,970 A | 2/1987 | Murphy | |
| 4,879,826 A | 11/1989 | Wittke | |
| 5,211,466 A | 5/1993 | Jarocki et al. | |
| 5,255,164 A | 10/1993 | Eidelman | |
| 5,359,796 A | 11/1994 | Werling | |
| 5,434,013 A * | 7/1995 | Fernandez | 428/690 |
| 5,497,572 A | 3/1996 | Hoffman | |
| 5,636,462 A | 6/1997 | Kleiman | |
| 5,711,100 A | 1/1998 | Elmer | |
| 5,884,997 A | 3/1999 | Stanuch et al. | |
| 5,934,797 A | 8/1999 | Schlaudroff et al. | |
| 6,056,425 A | 5/2000 | Appelberg | |
| 6,081,191 A | 6/2000 | Green et al. | |
| 6,178,677 B1 * | 1/2001 | Williams | 40/593 |
| 6,449,889 B1 | 9/2002 | Hottenstein | |
| 6,693,556 B1 * | 2/2004 | Jones et al. | 340/907 |
| 6,735,893 B2 | 5/2004 | Wolf | |
| 6,952,162 B2 * | 10/2005 | Monck et al. | 340/464 |
| 6,955,455 B2 | 10/2005 | Schneider | |
| 7,118,239 B2 | 10/2006 | Itoh et al. | |
| 7,121,700 B1 | 10/2006 | Scanlon | |
| 7,350,949 B2 | 4/2008 | Meinke et al. | |
| 7,467,846 B2 | 12/2008 | Karppinen et al. | |
| 7,468,677 B2 | 12/2008 | Pederson et al. | |
| 7,589,622 B2 | 9/2009 | Farley | |
| 7,621,662 B1 | 11/2009 | Colbert | |
| 7,635,209 B2 | 12/2009 | Uematsu et al. | |
| 7,825,790 B2 | 11/2010 | Tallinger | |
| 7,931,393 B2 | 4/2011 | Stempinski | |
| 2002/0062589 A1 | 5/2002 | Miller | |
| 2002/0171542 A1 | 11/2002 | Bloomfield et al. | |
| 2004/0227370 A1 | 11/2004 | Bader et al. | |
| 2004/0231209 A1 | 11/2004 | Love | |
| 2004/0260470 A1 | 12/2004 | Rast | |
| 2005/0018441 A1 | 1/2005 | Menke et al. | |
| 2006/0012487 A1 * | 1/2006 | Gibson et al. | 340/815.45 |
| 2006/0072303 A1 | 4/2006 | Dunkle et al. | |
| 2007/0008093 A1 | 1/2007 | Nigro et al. | |
| 2007/0103922 A1 | 5/2007 | Rissmiller et al. | |
| 2007/0234612 A1 | 10/2007 | Corbishley et al. | |
| 2008/0019141 A1 * | 1/2008 | Helms et al. | 362/544 |
| 2008/0036583 A1 * | 2/2008 | Canfield | 340/468 |
| 2008/0236007 A1 | 10/2008 | Au et al. | |
| 2009/0116257 A1 | 5/2009 | Rosemeyer et al. | |
| 2010/0194556 A1 | 8/2010 | LaRosa | |
| 2011/0167689 A1 | 7/2011 | Ford | |

\* cited by examiner

ILLUMINATED VEHICULAR SIGN

RELATED APPLICATIONS

The present application is a continuation-in-part application of co-pending U.S. patent application Ser. No. 13/385,697 filed on Mar. 2, 2012, which in turn, is a continuation-in-part application of U.S. Patent Application Ser. No. 61/464,515 filed on Mar. 4, 2011.

BACKGROUND OF THE INVENTION

The present invention relates to indicia that can be affixed on top of the horizontal planar surfaces of emergency response vehicles such as fire department vehicles, police cars and ambulances to provide visibility from above.

Most conventional emergency response vehicles provide audible alert warnings and visual alert warnings such as sequenced flashing of head, tail and side light assemblies, or a roof mounted light bar containing at least one light source designed to disburse light in 360 degrees. These lights may be solid, stroboscopic, revolving, flashing, modulated, pulsing, oscillating, alternating, or any combination thereof. Thus, these light systems are designed primarily for viewing from the front, rear, or side of emergency response vehicles.

While in most situations, any of the aforementioned devices would suffice in alerting a passerby of the presence of the emergency response vehicle, there are crucial situations in which greater visibility is required. For example, in the case of vehicular pursuits, helicopter units are often called for service to help ground units observe and track pursuits as well as ensure public safety while in pursuit. Helicopters provide valuable service to law enforcement in general and, more particularly, to the pursuit function. Helicopter units can assist ground units as a platform from which to observe, track and illuminate people or places on the ground. Moreover, the helicopter units serve as backup to ground units, and the helicopter flight crews can provide a perspective that cannot be achieved on the ground. Further, they can communicate with ground units and provide information to direct them toward an intended position or away from a dangerous one. In addition, the helicopter units can provide crucial information, such as reporting whether or not suspects are carrying weapons, etc.

There is a need for a system to assist helicopter units in distinguishing ground units and their positioning. Currently, many police vehicles already have numerals illustrated on top of their roofs. These numerals are used to differentiate a police vehicle from other vehicles and to help identify the police district, the unit, and the individual. However, typically, these numerals are in plain black text and are not illuminated. Therefore, when there is little or no light, it can be difficult to distinguish the numbers on top of a police vehicle.

Moreover, even if vehicles were provided with illuminated indicia, it is difficult to maintain consistent illumination as letters and numbers have different surface areas, and thus would have different power requirements to provide consistent illumination.

Therefore, there is a need for better identification of emergency response vehicles for being seen from above.

Furthermore, there is a need for improved power and switching systems to provide consistent illumination to illuminated indicia upon emergency response vehicles.

SUMMARY OF THE INVENTION

The present invention is directed to an illuminating alphanumeric lighting system for emergency response vehicles that is able to enhance the visibility of emergency response vehicles to those in the air, such as in helicopters.

The illuminated lighting system provides indicia, in the form of illuminated letters or numerals, on the top of the substantially planar surfaces of emergency response vehicles, such as upon the vehicle hoods, cabins and trunks. The size of the indicia may vary depending upon the purpose of the lighting system, and the size of the horizontal surface upon which the indicia is placed. However, preferred letters and numerals have a length greater than one (1) foot and a width greater than one-half (½) foot. More preferably, the letters and numbers have a length of one (1) to five (5) feet and a width of one-half (½) foot to two (2) feet. Still more preferred, the letters and numbers have a length of approximately two (2) feet and a width of one (1) foot.

To provide illumination to the illuminated numerals, power is provided from the vehicle's electrical systems, such as from the vehicle's battery and alternator. The electrical wiring and switching system for the luminescent panels would be readily understood by those skilled in the art and need not be described in detail herein.

The luminescent numerals and letters may be constructed in various manners. As a first example, the luminescent letters and numbers may be made using a light pipe, also known as a light guide, connected to an independent light source. The light source may be any of various available lighting constructions known in the art. For example, the light source may comprise one or more incandescent light bulbs, light emitting diodes, light emitting crystals, etc. Moreover, the light source may produce light which can be selectively varied in color so as to enable the operator to alter the color of the luminescence. For example, the light source may comprise a plurality of diodes with each diode producing different colored light. Selective activation and deactivation of the diodes alone or in combination will produce illumination in different colors.

The light guide may be constructed in various shapes and of various materials such as of lengths of acrylic plastic, polycarbonate, or glass to form the desired letters or numerals for display from the top of a vehicle. Alternatively, the light pipe may be constructed of one or more fiberoptic fibers or cables. The light pipes may also be constructed of one or more different translucent and flourescent colored materials for projecting light of one or more colors. An acceptable colored material includes "scintillating plastic" which is typically an acrylic plastic incorporating different colored flourescent dyes. Preferably, the light guide includes a reflecting bottom layer for directing light upwardly so as to be seen from above.

Where the light guide incorporates fiberoptic cables, the fiberoptic cables are also constructed to project light laterally from their cylindrical exterior as opposed to predominantly from their distal extremities. This can be accomplished by notching, knurling, scratching or in other manners creating flaws in the otherwise smooth exterior cylindrical surface of the fiberoptic cable. These flaws have been found to interrupt the transmission of light along the length of the fiberoptic cable and to transmit light laterally from the exterior surface of the fiberoptic cable, typically opposite the side which has been flawed.

In an additional preferred embodiment of the present invention, the luminescent letters and numbers are constructed of substantially planar electroluminescent (EL) panels. A first EL construction is described in U.S. Pat. No. 5,045,755 issued to Appelberg and assigned to E-Lite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which is formed in the shape of numerals and letters.

An additional preferred electroluminescent panel for producing the luminescent letters and numbers can be obtained from MKS, Inc. located in Bridgeton, N.J., USA under the trademark designation Quantaflex™. The Quantaflex™ material is an electroluminescent lamp including luminescent phosphors embedded in the dielectric medium of a capacitor constructed in the form of a sheet. Electrodes, including at least one translucent electrode, form the top and bottom layers of the Quantaflex™ material. Upon application of an alternating current to the electrodes, the phosphors give off photons producing light in the visible spectrum. An advantage of the Quantaflex™ material is that the phosphors can be selectively encapsulated between the electrode layers of the luminescent sheet so as to selectively produce patterns of light emitted from the luminescent sheet.

In still additional preferred embodiments, the luminescent numbers and letters are constructed of one of the rapidly developing technologies directed to Organic Light Emitting Devices (OLED), Transparent Organic Light Emitting Devices (TOLED), or Flexible Organic Light Emitting Devices (FOLED). Descriptions of these technologies are available to those skilled in the art and need not be described in further detail herein.

In still an additional embodiment illustrated, the luminescent letters and numerals are provided by a panel including dozens or hundreds of rows and columns of LEDs or the like which can be selectably illuminated to form a desired indicia. For this embodiment, it is preferred that the LEDs are connected by wires to a controllable switching system, which in turn is connected to a computer processor or the like. The computer processor, in turn, includes an input device such as a keyboard or control panel to allow controlled independent illumination of selected LEDs to form the desired indicia. Though more expensive and requiring more complicated wiring and processing capabilities to select appropriate illumination to display desired characters, this embodiment allows for the indicia to be rapidly changed as desired. In an embodiment, these LEDs may produce only infrared light not visible to the human eye and thus only visible through night vision goggles. This alternative method is advantageous when light is not desirable which might alert criminals that police are approaching.

Preferably, a controller in the form of a switching system or computer processor are provided to allow operators to control the operation of the illuminated indicia. Even more preferably, the switching system can selectively strobe the illuminated indicia. In still an additional embodiment, the switching system includes manual or automatic variable resistors for controlling the wattage provided to each illuminated indicia so that the wattage may be varied between each illuminated indicia.

Advantageously, the luminescent numerals and letters may be adhered directly to the roof or top of an emergency response vehicle. However, in an alternative embodiment, a rectangular frame is provided for affixing the luminescent panels to the top of the roof of emergency response vehicles. In still an additional embodiment, a planar plate is provided which affixes to the vehicle manufacturer's preexisting female threads formed into the roof of the vehicle which are typically used for mounting a roof rack.

Once mounted to the roof of a vehicle, the illuminated numerals and letters are easily visible to those in the air.

Thus, it is an additional object of the invention to provide a structure for identifying emergency response vehicles from the air, such as by those in planes and helicopters.

Further, it is an object of the present invention to provide an improved vehicular external lighting system capable of operating with a low current draw and able to be simply integrated into an existing vehicle's electrical system.

These and other and more specific objects and advantages of the invention will be apparent to those skilled in the art from the following detailed description taken in conjunction with the drawings.

DETAILED DESCRIPTION OF THE INVENTION

Figure 1:
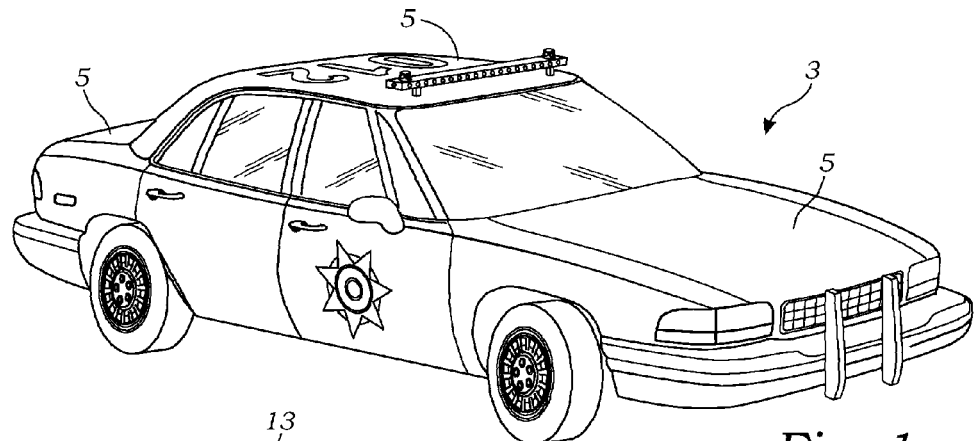
FIG. 1 is a perspective view of an emergency response vehicle equipped with illuminated indica affixed on top of the roof.

While the present invention is susceptible of embodiment in various forms, as shown in the drawings, hereinafter will be described the presently preferred embodiment of the invention with the understanding that the present disclosure is to be considered as an exemplification of the invention, and it is not intended to limit the invention to the specific embodiments illustrated.

With reference to FIGS. 1-17, the present invention is a vehicular illuminated sign 1. The vehicular illuminated sign comprises two primary components including the vehicle 3 and luminescent planar sheet 7. The terms "vehicle" and "luminescent planar sheet" are to be interpreted broadly as to encompass a wide variety of embodiments as would be understood by those skilled in the art. For example, the vehicle 3 is any wheeled vehicle for travel upon the roads and highway of this country including automobiles, trucks, vans, etc. The present invention is intended primarily for emergency response vehicles. However, the invention may have application for identifying trucking fleets and the like. Each of these vehicles have substantially horizontal planar surfaces 5, such as the hood, cabin top, and trunk illustrated in FIGS. 6 and 7.

The luminescent planar sheet 7 of the present invention is mounted upon one or more of the vehicle's horizontal planar surfaces 5. The luminescent planar sheet 7 is mounted substantially horizontally so as to display indicia 9 upwardly. The indicia 9 is in the form of one or more alpha-numeric characters having a length (commonly referred to as a height) and a width. The alpha-numeric characters are provided to identify a vehicle, and thus are preferably unique to that vehicle. The alpha-numeric characters may have any height or width as necessary so as to identify the vehicle from the air. However, the alpha-numeric characters preferably have a length greater than 1 ft. and a width greater than 1-0.5 ft. Still more preferably, each of these numbers or letters forming the indicia have a length of approximately 2 ft. and a width of 1 ft.

The luminescent planar sheets may be constructed to produce light in various colors, and may switch between different colors. In still an additional embodiment of the present invention, the luminescent planar sheet may be constructed to produce light which is primarily invisible to the human eye such as in the infrared spectrum. The term "primarily invisible to the human eye" is intended to be interpreted broadly because traditional light sources producing light in the infrared spectrum, including heat producing systems, will often produce a minimal amount of light in the visible spectrum. However, as understood by those skilled in the art, such infrared/thermal light sources are highly visible when wearing night vision goggles or the like.

The luminescent planar sheet is connected to a power system mounted within the vehicle. The power system may be in the form of a battery separate from the vehicle's traditional battery mounted under the hood. However, preferably the illuminated vehicular sign utilizes the power system already provided in a vehicle including the battery and alternator. To control the power to the luminescent planar sheet 7, preferably one or more switches are positioned within the vehicle's cabin so as to control the on or off illumination of the sign. Further, switches may be provided to control the brightness of the illumination and/or color being illuminated. For example, the signage may change colors so as to indicate different events. For example, the luminescent planar sheet may be made to illuminate red in the event of an emergency. Alternatively, the luminescent planar sheet may be made to strobe in the event of an emergency. Switching systems for providing these features can be easily deduced by those skilled in the art and are not described further herein.

Figure 2:
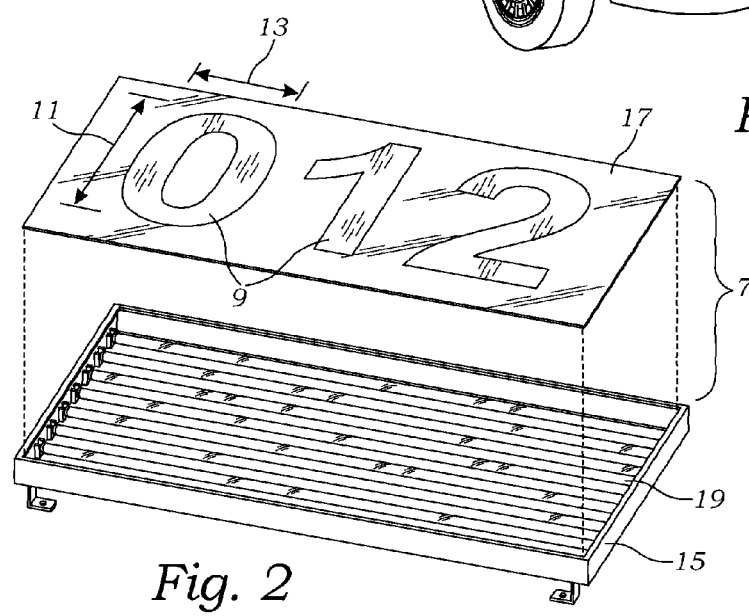
FIG. 2 is a top-exploded view of a frame possessing luminescent panels of the present invention.
Figure 3:
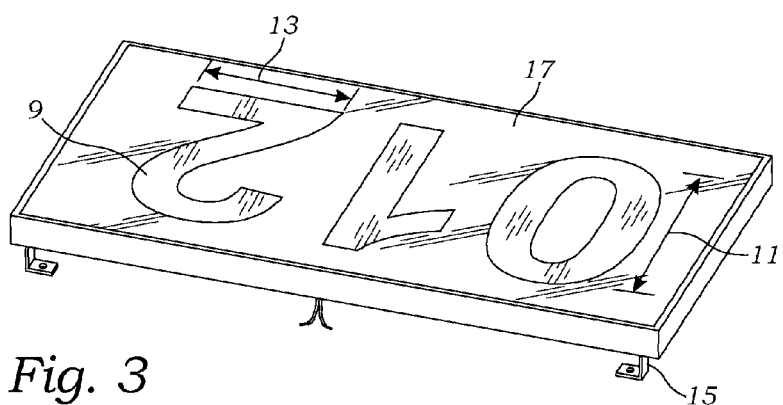
FIG. 3 is a top view of a frame possessing luminescent panels of the present invention.
Figure 4:
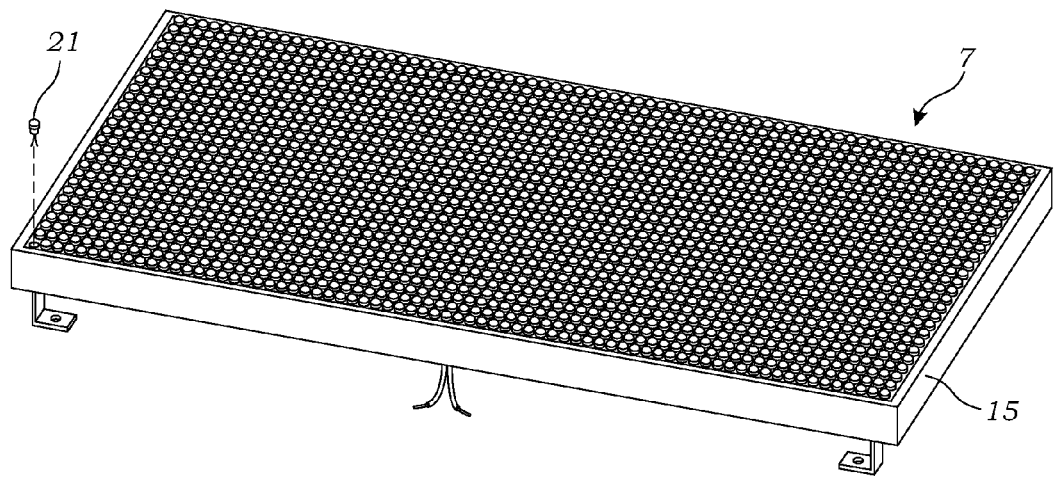
FIG. 4 is a top view of a frame possessing luminescent panels of the present invention possessing LED's.
Figure 5:
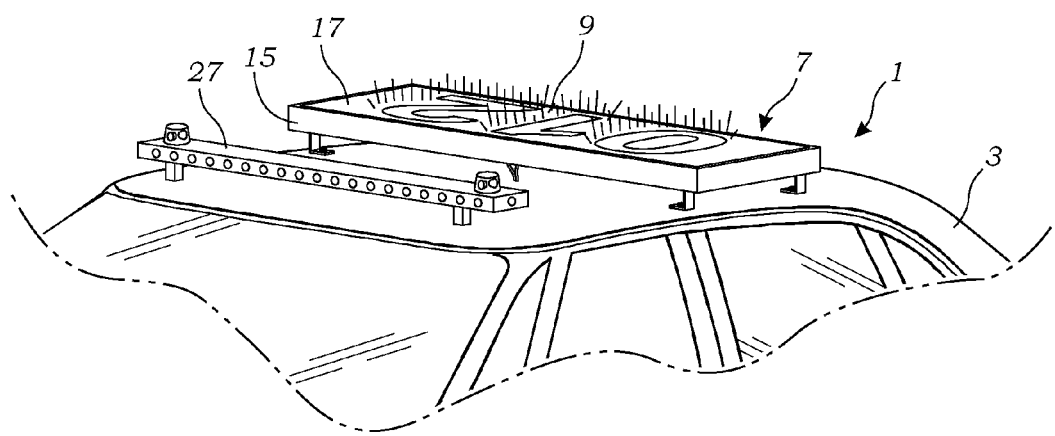
FIG. 5 is a front perspective view of the present invention.
Figure 6:
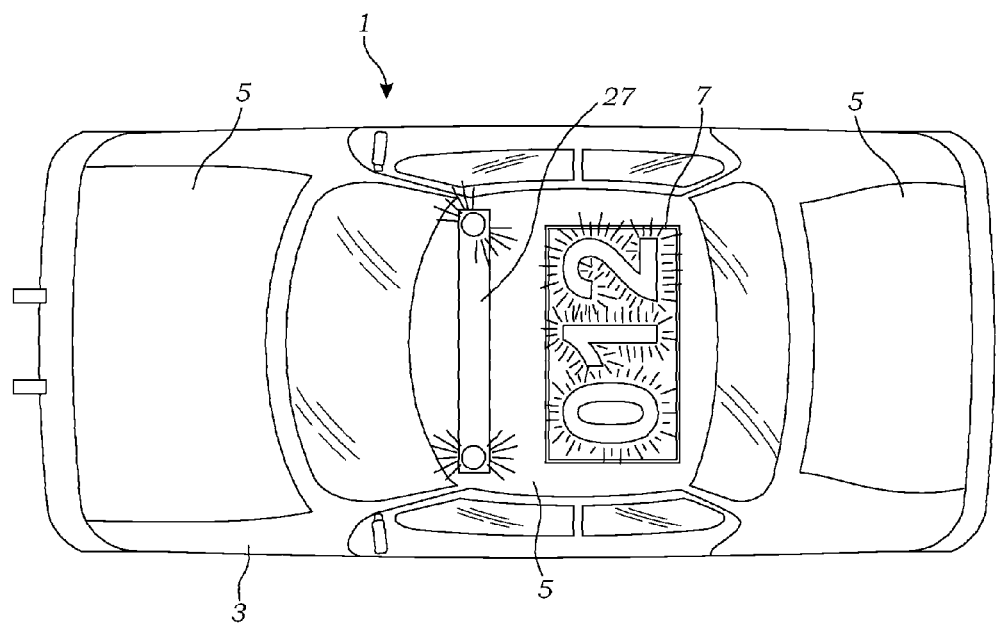
FIG. 6 is a top elevation view of the present invention.
Figure 7:
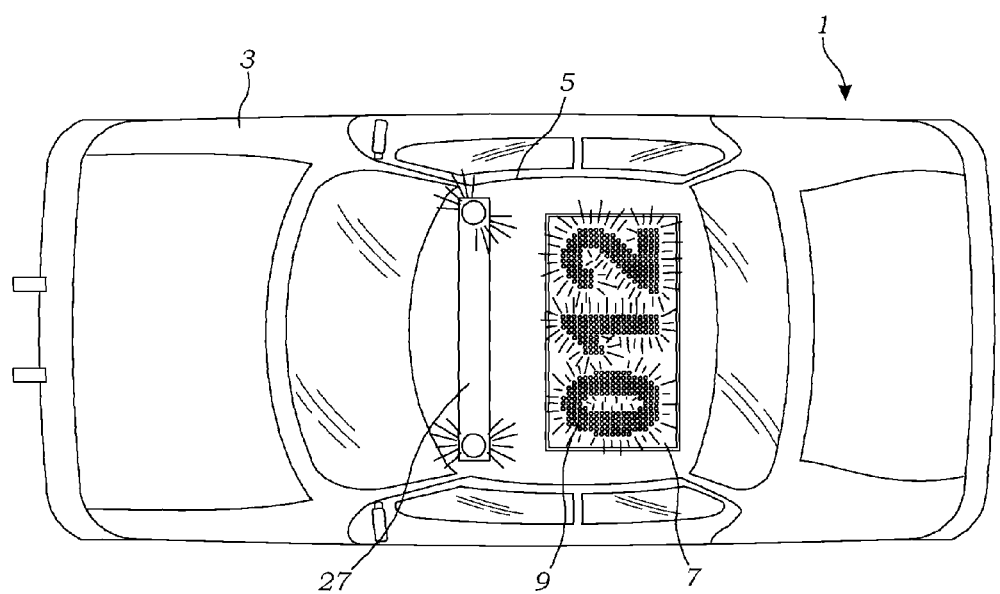
FIG. 7 is a top elevation view an alternative embodiment of the present invention.

As illustrated in FIGS. 2-10, the luminescent planar sheet may be constructed in various manners. As illustrated in FIGS. 2 and 3, in a first embodiment, the luminescent planar sheet comprises a light pipe 17 and an independent light source in the form of florescent bulbs. The light pipe may be made to create opaque alpha-numeric characters with luminescence borders around the alpha-numeric characters. Alternatively, the luminescent planar sheet may be made to create luminescent alpha-numeric characters and an opaque border so as to identify such characters. As illustrated in FIGS. 4 and 5, the luminescent planar sheet may comprise a plurality of LEDs forming the light source which is again covered by a light pipe 17. Again, as illustrated in FIGS. 6 and 7, the indicia may be made to illuminate with an opaque border. Alternatively, the illuminated planar sheet may be made to have opaque indicia with an illuminated border. Where LEDs are employed, the switches controlling activation of the LEDs may be controlled by a computer processor as to form different indicia as desired.

Figure 8:
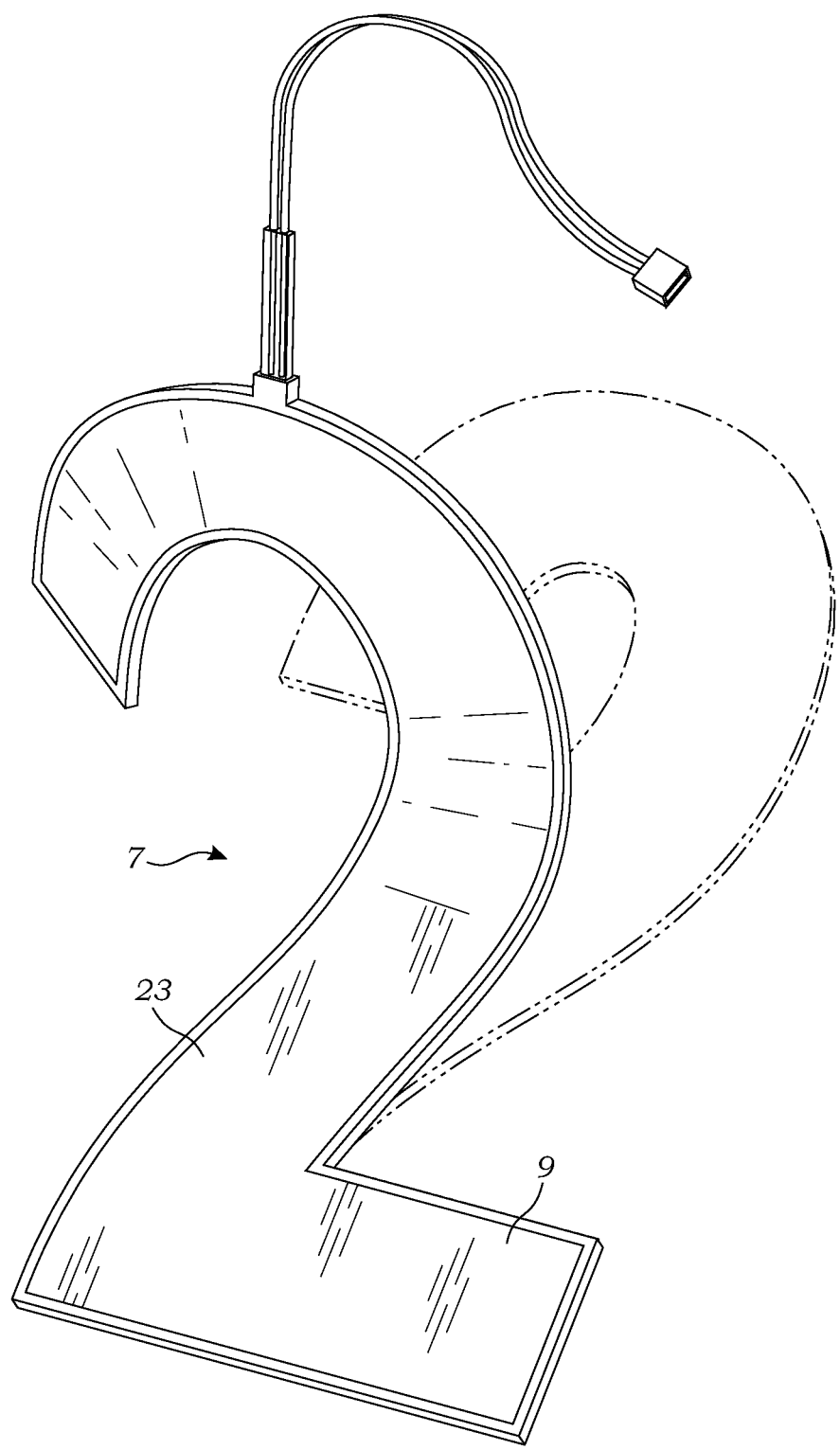
FIG. 8 is a perspective view of illuminated indicia in the form of an electroluminescent panel.
Figure 9:
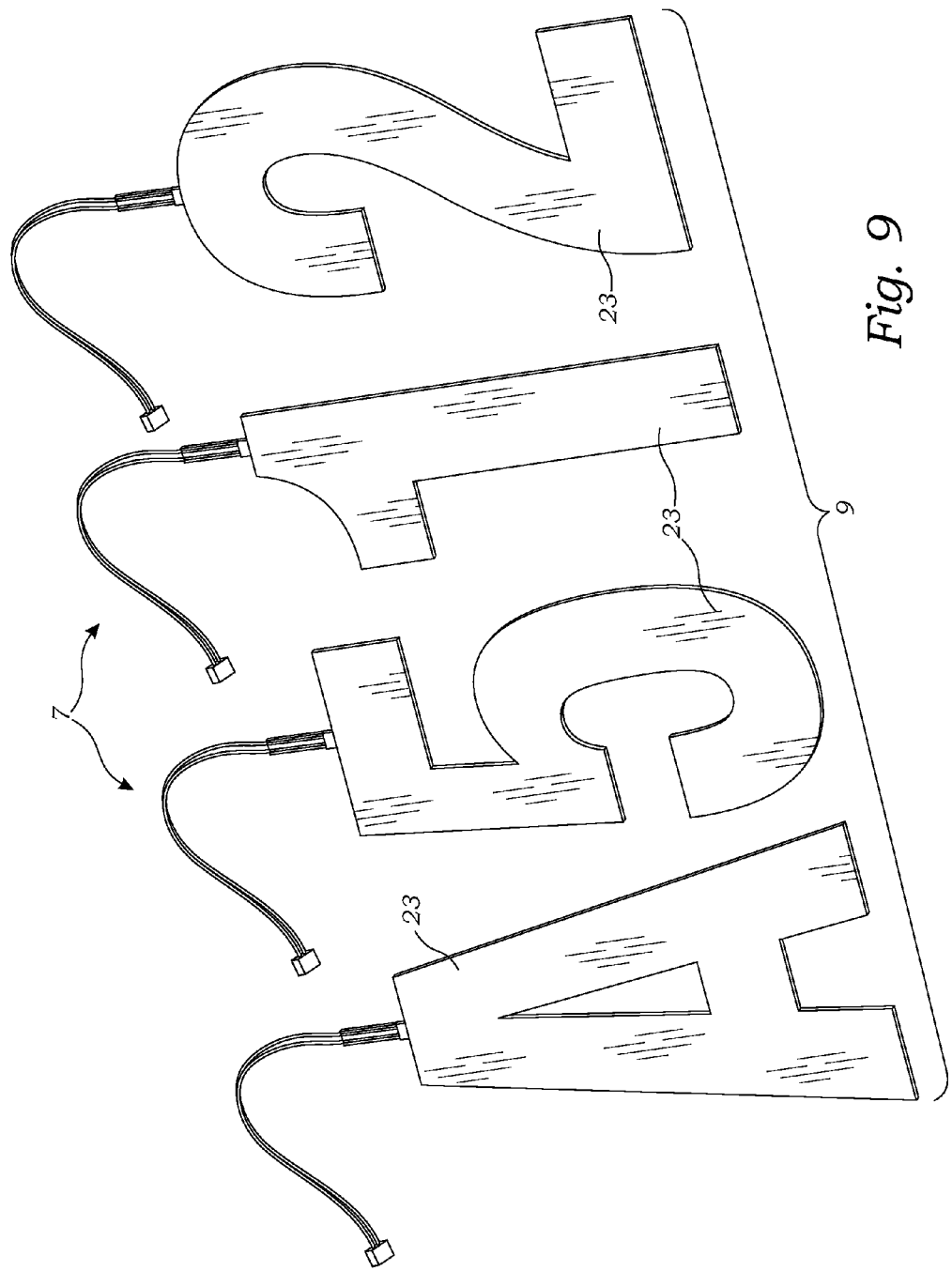
FIG. 9 is a perspective view of illuminated indicia in the form of four electroluminescent panels for identifying an emergency response vehicle.
Figure 10:
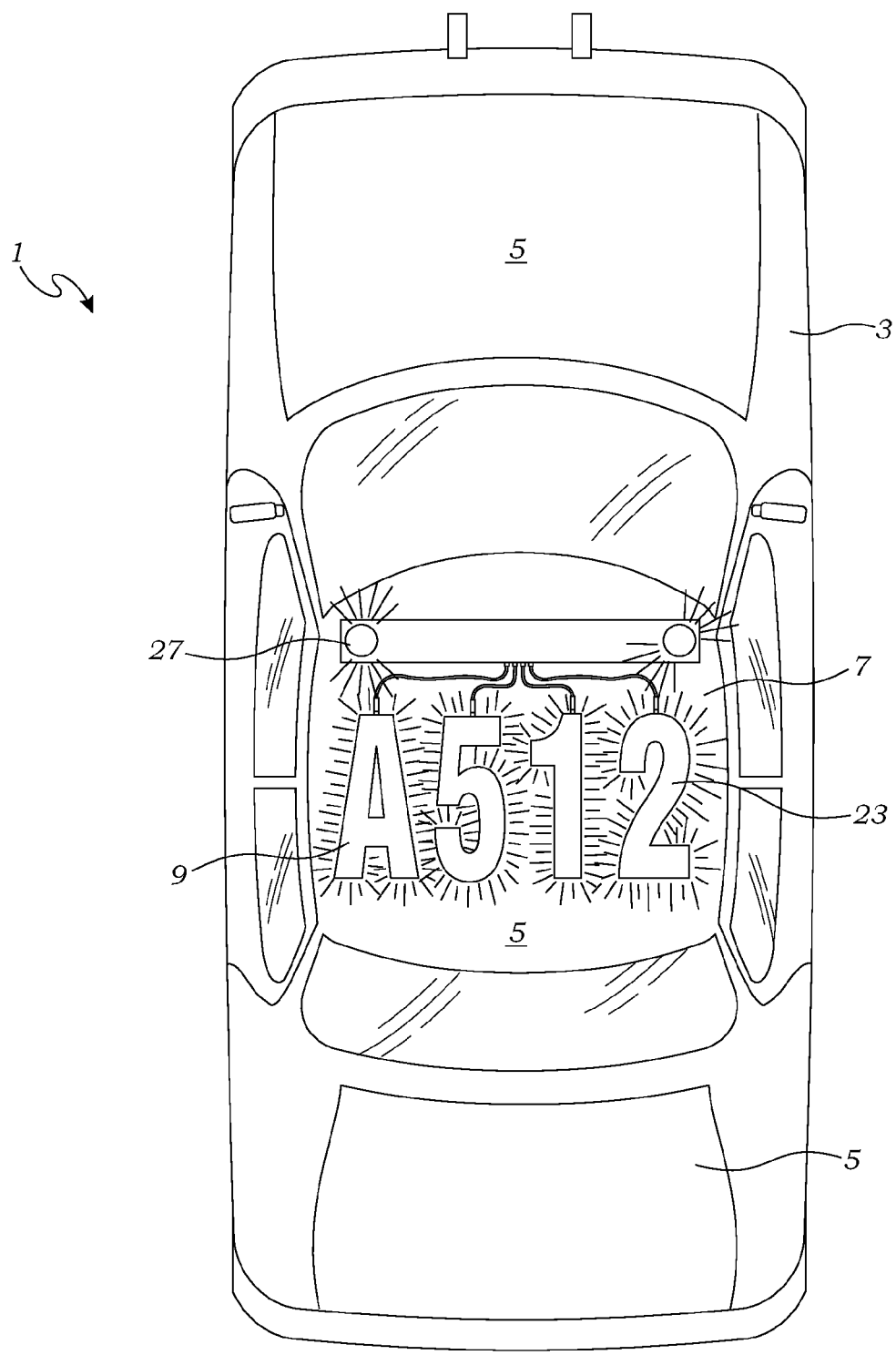
FIG. 10 is a top plan view of illuminated indicia in the form of four electroluminescent panels for identifying an emergency response vehicle.
Figure 11:
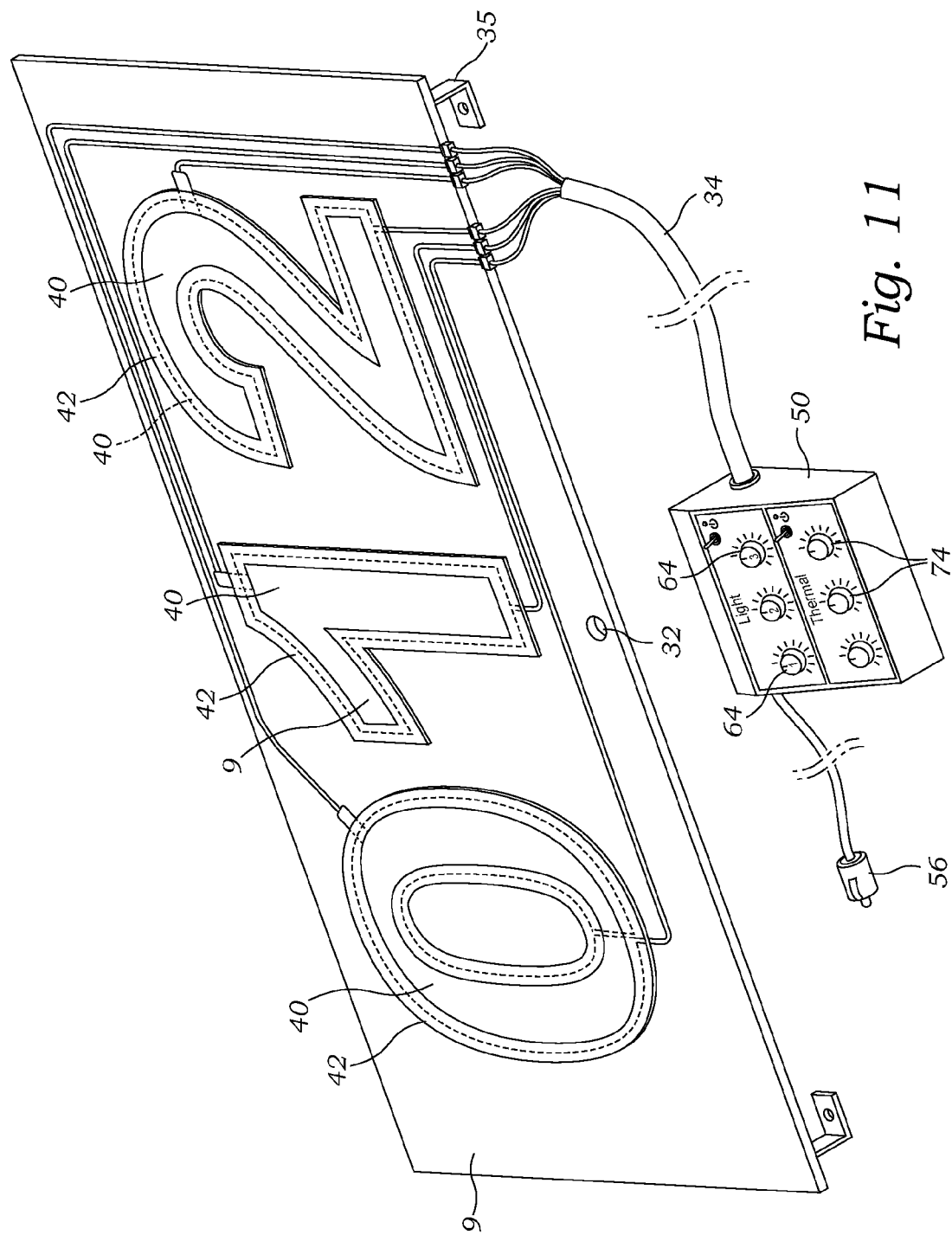
FIG. 11 is a top perspective view of illuminated indicia in the form of three luminescent panels connected to a controller for activating and controlling the amount of wattage provide to electroluminescent indicia and for activating and controlling the amount of wattage provided to infrared/thermal indicia.
Figure 12:
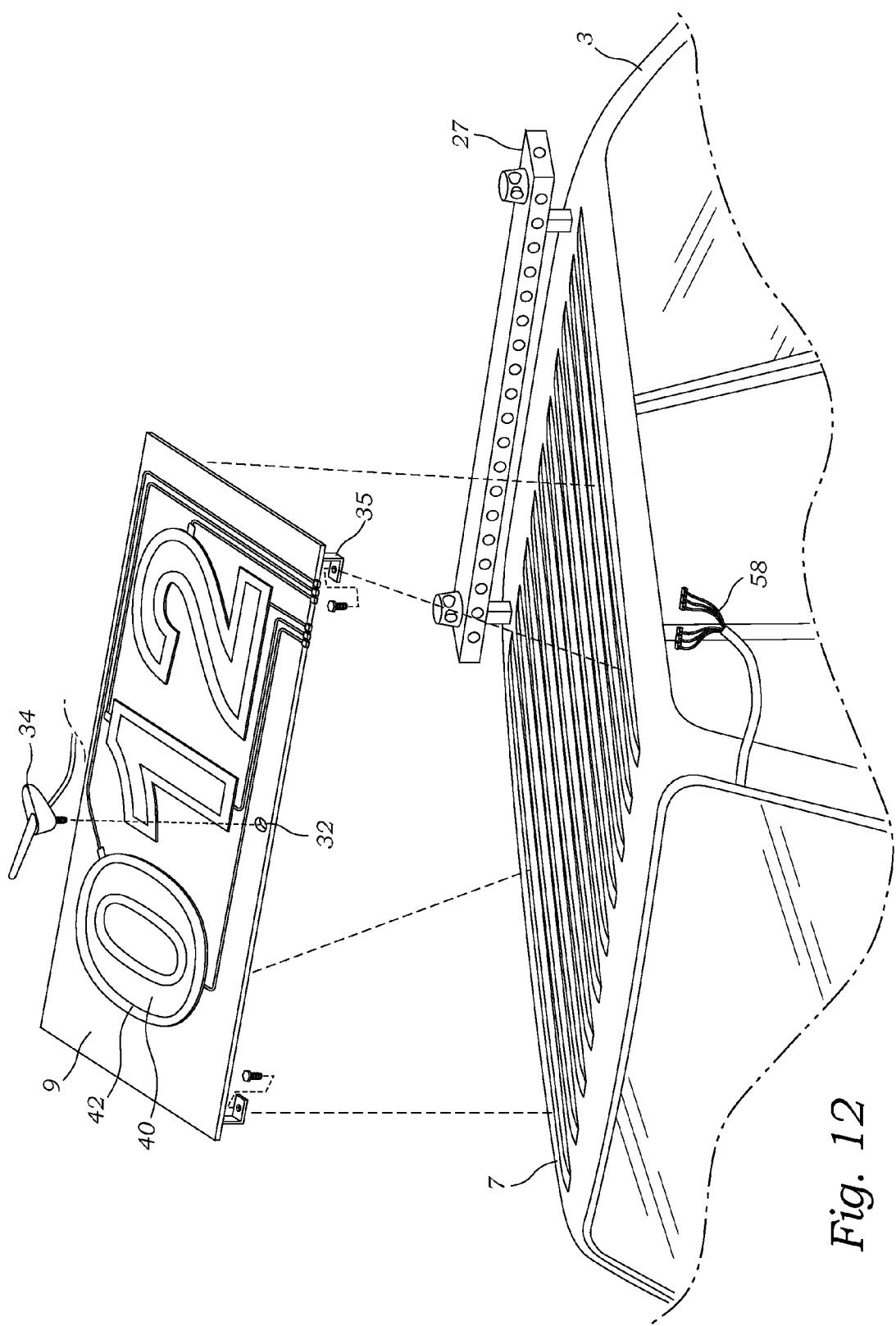
FIG. 12 is a perspective view of illuminated indicia in the form of three luminescent panels and a radio frequency antennae affixed to a planar panel constructed to be mounted to upon the corrugated roof of a vehicle.
Figure 13:
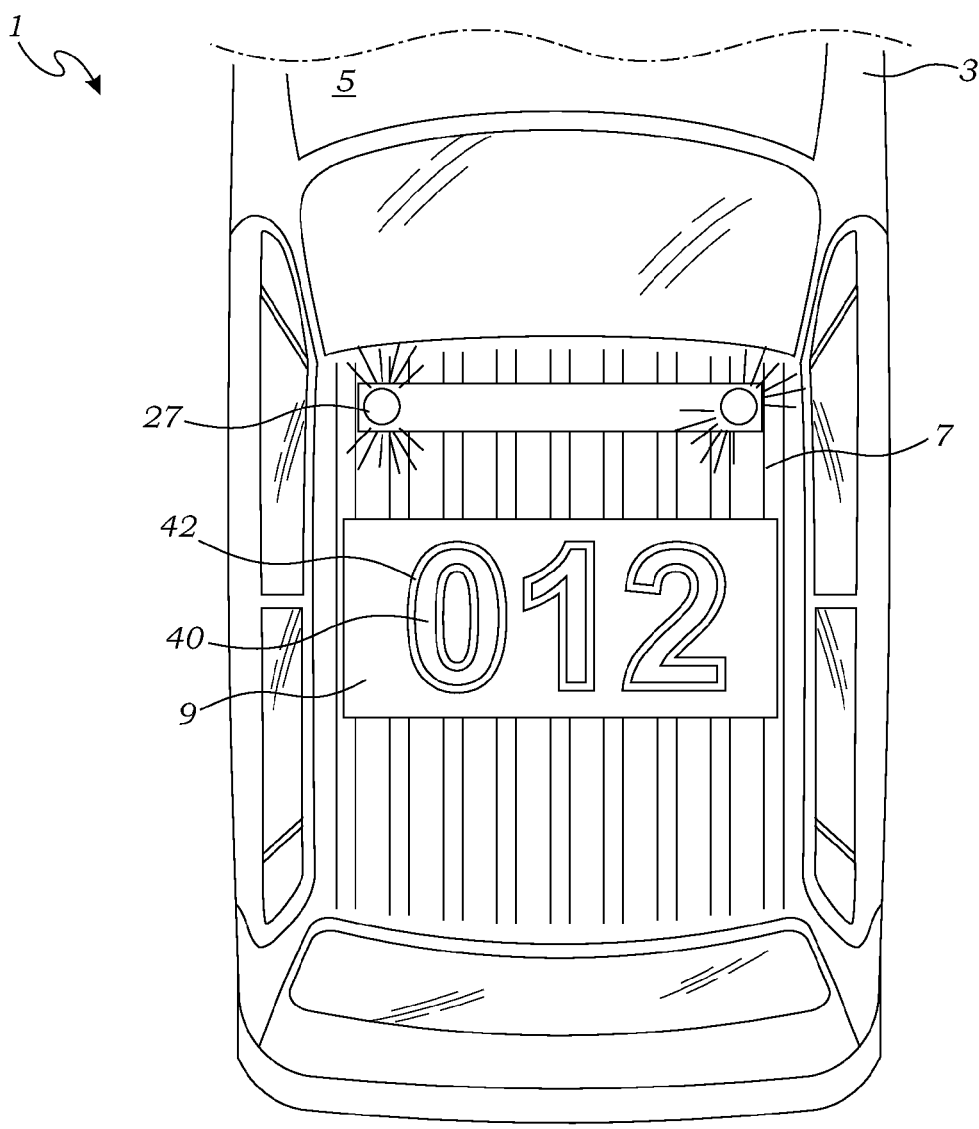
FIG. 13 is a top plan view of illuminated indicia in the form of three luminescent panels affixed to a planar panel which in-turn is mounted to upon the corrugated roof of a vehicle, and illustrating a controller for activating and controlling the amount of wattage provide to electroluminescent indicia and for activating and controlling the amount of wattage provided to infrared/thermal indicia.
Figure 13:
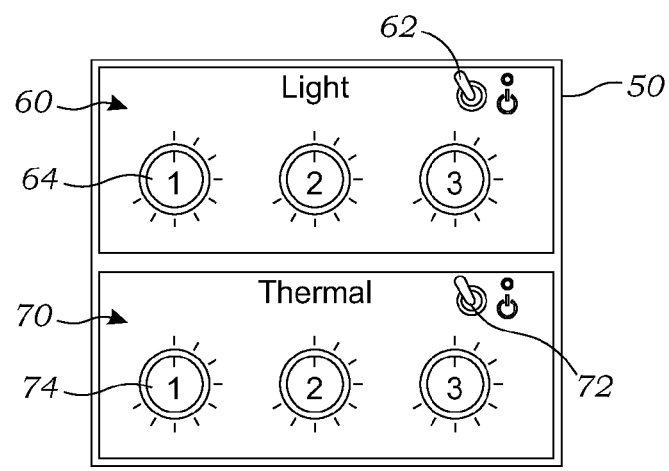
Figure 14:
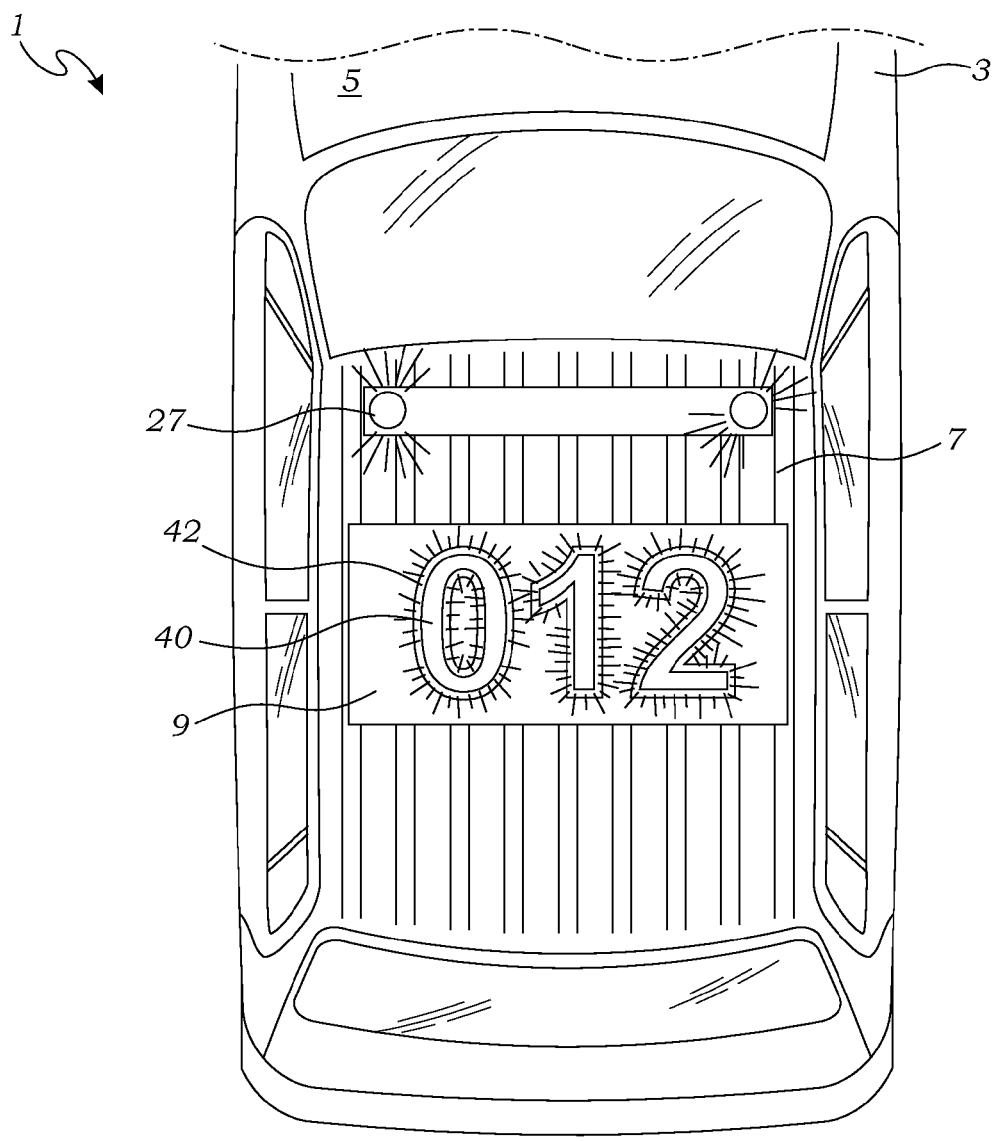
FIG. 14 is a top plan view of the luminescent panels, planar panel, vehicle, and controller of FIG. 13 wherein the controller has activated and adjusted the wattage provided to the electroluminescent indicia.
Figure 14:
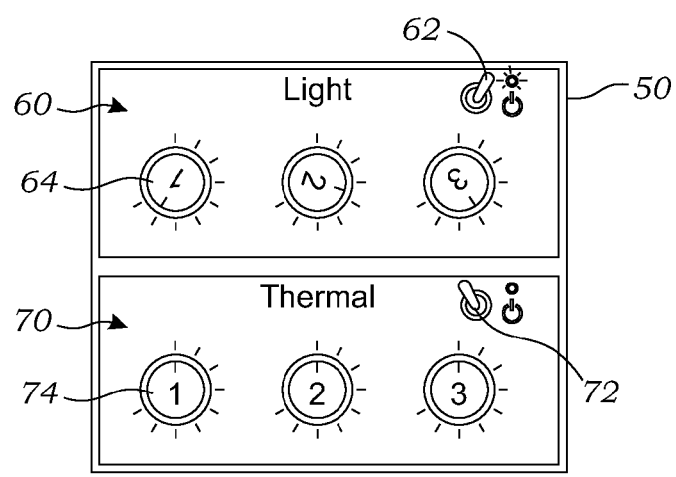
Figure 15:
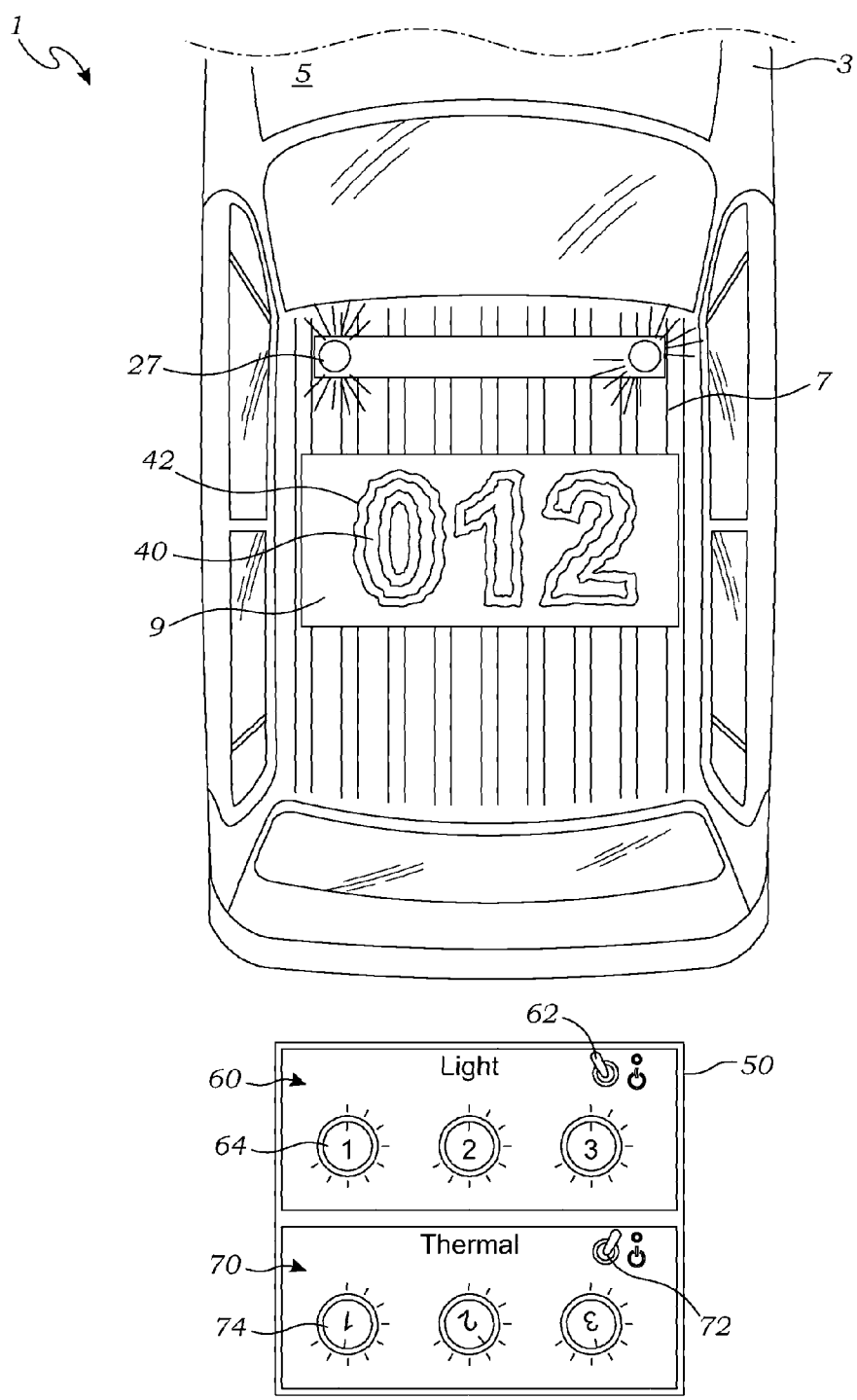
FIG. 15 is a top plan view of the luminescent panels, planar panel, vehicle, and controller of FIG. 13 wherein the controller has activated and adjusted the wattage provided to the infrared/thermal indicia.
Figure 16:
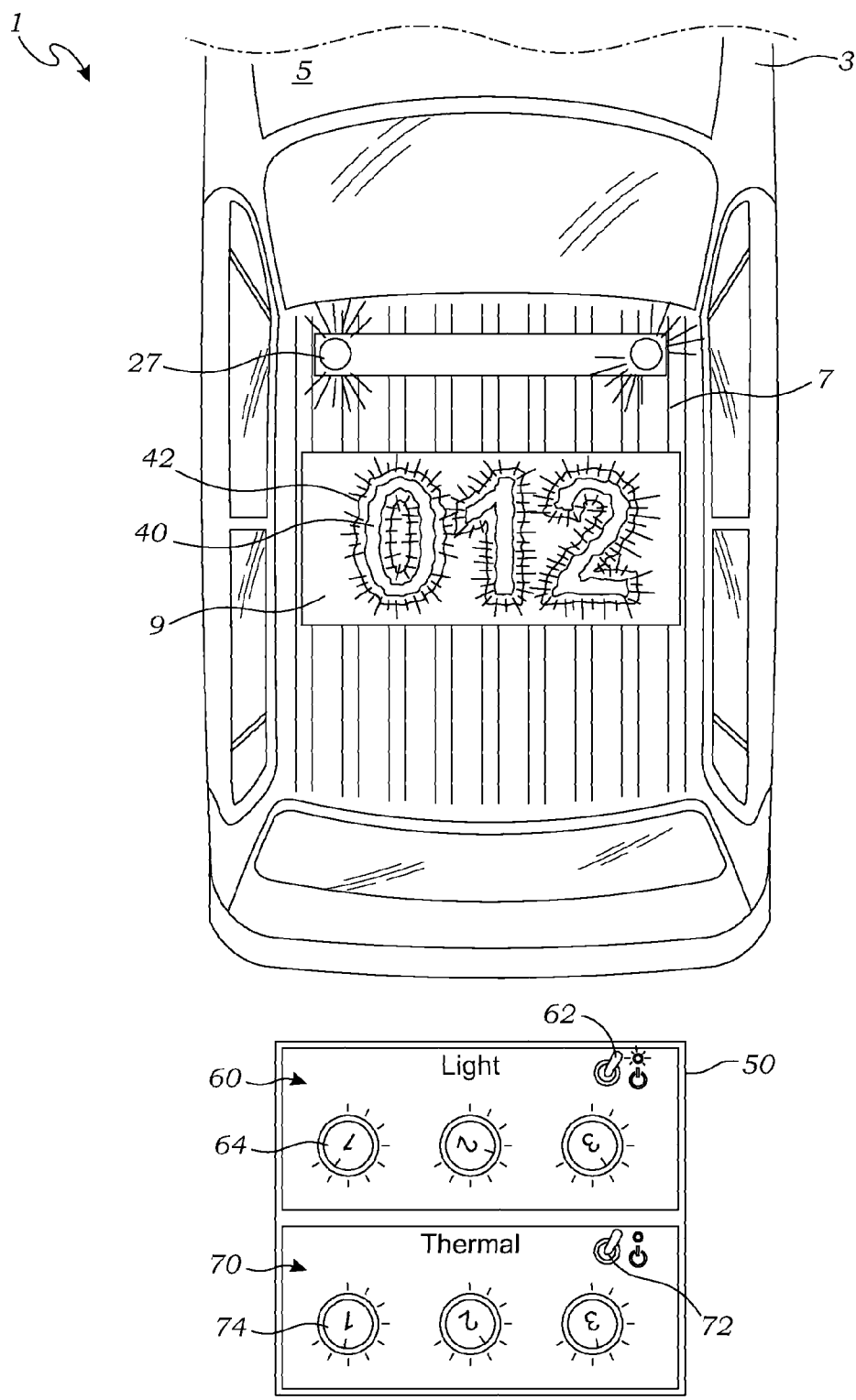
FIG. 16 is a top plan view of the luminescent panels, planar panel, vehicle, and controller of FIG. 13 wherein the controller has activated and adjusted the wattage provided to the infrared/thermal indicia, and the controller has activated and adjusted the wattage provided to the electroluminescent indicia.
Figure 17:
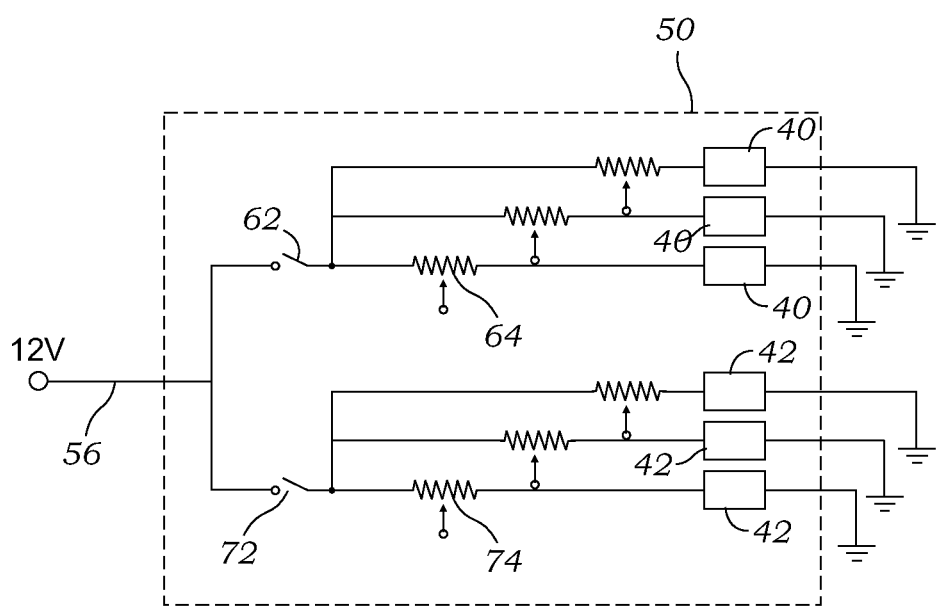
FIG. 17 is a simplified electrical diagram illustrating the switching system including adjustable variable resistors to adjust the wattage provided to each infrared/thermal indicia and to each electroluminescent indicia.

In still an additional embodiment illustrated in FIGS. 8-10, the luminescent planar sheet 7 is constructed in the form of one or more electroluminescent (EL) panel lamps. The electroluminescent panels may be constructed in various forms such as described in U.S. Pat. No. 5,045,755. Alternatively, the electroluminescent panels may be constructed of organic light emitting diodes or devices (OLED), transparent organic light emitting devices (TOLED), or flexible organic light emitting devices (FOLED).

Advantageously, where the luminescent planar sheet 7 is constructed in the form of an EL panel 9, the EL panel can be adhered directly to one of the vehicle's horizontal planar surface 5. Conversely, where the luminescent planar sheet 7 is constructed to include LEDs or light bulbs, the luminescent planar sheet 7 will typically require a frame 15 for holding the light source, as illustrated in FIGS. 2-5. As illustrated in FIG. 10, preferably any wires for supplying power to the luminescent planar sheet can be routed to a vehicle's existing light bar 27.

As illustrated in FIGS. 11-17, in the currently preferred construction of the vehicular lighting system, each luminescent indicia 9 is constructed to include a central electroluminescent portion powered by a first electrical circuit and a thermal/infrared portion 42 powered by a second electrical circuit. Preferably, the thermal/infrared portion is simply a highly resistant material, such as a silver or copper alloy, in the form of the indicia. As illustrated, the silver material 42 may be printed to form an elongate circuit upon the substrate material adjacent to the illuminated portion of the electroluminescent portion. In operation, a voltage is applied to the resistant material 42 causing the thermal/infrared portion to be heated to form thermal/infrared indicia.

A preferred illuminated vehicle sign of the present invention utilizes electroluminescent indica operating at 14.4 volts and 800 Hz. To provide these power characteristics, preferably an inverter (not shown) converts the vehicle's DC 12 volts to a nominal 14.4 volts and 800 Hz. However, alphanumeric characters of the same font size have different surface areas. For example, preferred electroluminescent numbers having the same 20 inch height have the following respective surface areas.

| Number | Square Inches |
|--------|---------------|
| 0 | 117 |
| 1 | 68 |
| 2 | 110 |
| 3 | 98 |
| 4 | 107 |
| 5 | 113 |
| 6 | 110 |
| 7 | 78 |
| 8 | 121 |
| 9 | 110 |

It has been discovered that providing each of numerals with the same wattage results in some numbers being brighter than others. Similarly, if the same wattage is provided to each thermal/infrared portion of the luminescent indicia, this will result in some indicia having a much greater temperature than other indicia or will result in alphanumeric characters with lesser surface areas "burning" out quicker than others. Moreover, it is common to substitute the alphanumeric characters atop emergency response vehicles.

To overcome these problems, as illustrated in FIGS. 11-17, the switching system 50 of the present invention includes adjustable variable resistors 64 and 74 which adjust the current, and accordingly, the wattage provided to the electroluminescent portion and/or thermal/infrared portion of the indicia to provide uniform luminescence. In one embodiment of the invention, the adjustable variable resistors 64 and 74 are controlled automatically based upon automated determinations of the size of each indicia. To this end, preferably the switching system includes one or more resistance, current, voltage, or wattage sensors for measuring the resistance, current, voltage or wattage of the electroluminescent portion and/or thermal/infrared portion of the luminescent planar sheets, and includes a controller for automatically adjusting the resistance of the adjustable variable resistors 64 and 74 based upon measurements made by these sensors. The circuitry for providing this automatic adjustment of the adjustable variable resistors 64 and 74 can be determined by those skilled in the art without undue experimentation.

In an alternative embodiment of the invention illustrated in FIGS. 11-17, the switching system 50 includes manually controlled variable resistors 64 and 74. Preferably, the switching system 50 includes on/off switches 62 and 72 for activating and deactivating either the electroluminescent portions and/or the thermal/infrared portions 42, and includes manually rotatable switches 64 and 74 for varying the resistance, and thus wattage provided to the electroluminescent portions and/or the thermal/infrared portions 42. Though illustrated in FIGS. 11-17 as in one control box, it is preferred that the on/off switches 62 and 72 be located within the vehicle cabin so as to be easily accessible to emergency response personnel, and it is preferred that the manually rotatable switches 64 and 74 be located so as to be accessible only during installation of vehicular illuminated sign 1 so as to not be inadvertently altered after installation.

In still an additional embodiment, the luminescent panels include one or more resistors (not shown) located within each of the luminescent panels to provide uniform electrical characteristics across the spectrum of different alphanumeric characters. More specifically, for this embodiment, the luminescent indicia are constructed to include resistors electrically connected to the electroluminescent circuitry and/or the thermal/infrared circuitry so that alphanumeric characters of different surface areas can be swapped but still provide uniform luminescence.

Currently, non-illuminated indicia are adhered directly to the roof and trunk areas of emergency response vehicles. Unfortunately, some vehicles have corrugated roofs which result in the alphanumeric characters being warped when adhered to such roofs and difficult to read from above, such as by those in helicopters. As illustrated in FIGS. 11-16, the illuminated vehicle sign 1 of the present invention includes a planar plate 30 upon which the luminescent planar panels 9 are affixed. The luminescent planar panels are affixed to the planar plate 30 using adhesives or the like. To mount the planar plate 30 to the roof of the vehicle, preferably the vehicle is constructed to include a traditional roof rack, and to this end, also includes four or more bolt holes installed by the original manufacturer of the vehicle. If installed, the roof rack is removed. The planar plate 30 includes flanges 35 that extend downwardly to mount to the vehicle bolt holes. Bolts, or other threaded fasteners, are employed to affix the planar plate 30 in place. Where the vehicle roof is corrugated to form a plurality of longitudinal troughs, the bolt holes may be located in such troughs. For this construction, the planar plate is constructed to include elongate flanges that will project into the troughs. The flanges include holes for receiving male fasteners which mount to the bolt holes.

Preferably, the planar plate includes a hole 32 for mounting a radio frequency antennae 34 typically required of emergency response vehicles. Furthermore, though not shown, the light bar 27 may also be mounted to the planar plate 30 to reduce or eliminate holes drilled into the vehicle after leaving the original manufacturer.

While several particular forms of the invention have been illustrated and described, it will be apparent that various modifications can be made without departing from the spirit and scope of the invention. Accordingly, it is not intended that the invention be limited except by the following claims.

I claim:
1. An illuminated vehicular sign comprising:
a vehicle having four or more wheels, the vehicle having at least one substantially planar surface in the form of a hood surface, cabin roof surface, or trunk surface;
two or more electroluminescent planar panels mounted upon said substantially planar surface, said two or more luminescent planar panels in the shape of two or more letters or numbers;
a power source for providing power to the two or more luminescent planar panels; and
a switching system electrically connected to said two or more luminescent planar panels and said power source for selectively controlling the transfer of power from said power source to said two or more luminescent planar panels, said switching system including a controller, two or more adjustable variable resistors with a first adjustable variable resistor electrically connected to a first planar panel for allowing one to selectively adjust the wattage provided to the first planar panel and a second adjustable variable resistor electrically connected to a second planar panel for allowing one to selectively adjust the wattage provided to the second planar panel.
2. The illuminated vehicular sign of claim 1 wherein said adjustable variable resistors are manually adjustable.
3. The illuminated vehicular sign of claim 1 wherein said switching system further comprises:

one or more resistance, current, voltage, or wattage sensors for measuring the resistance, current, voltage or wattage of said two or more luminescent planar panels, and said controller for automatically adjusting the resistance of said adjustable variable resistors based upon measurements made by said sensors.

* * * * *